(No Model.)

T. J. DE SABLA.
VELOCIPEDE.

No. 341,736. Patented May 11, 1886.

WITNESSES:
Aug Creveling
W. W. Weston

INVENTOR
Theodore J. de Sabla
BY
Charles N. Fowler
ATTORNEY

UNITED STATES PATENT OFFICE.

THEODORE J. DE SABLA, OF NEW YORK, N. Y.

VELOCIPEDE.

SPECIFICATION forming part of Letters Patent No. 341,736, dated May 11, 1886.

Application filed January 13, 1886. Serial No. 188,393. (No model.)

*To all whom it may concern:*

Be it known that I, THEODORE J. DE SABLA, a citizen of the United States, residing at the city, county, and State of New York, have invented a new and useful Improvement in Velocipedes, of which the following is a specification, reference being had to the accompanying drawings, forming a part of the same, in which—

Figure 1:
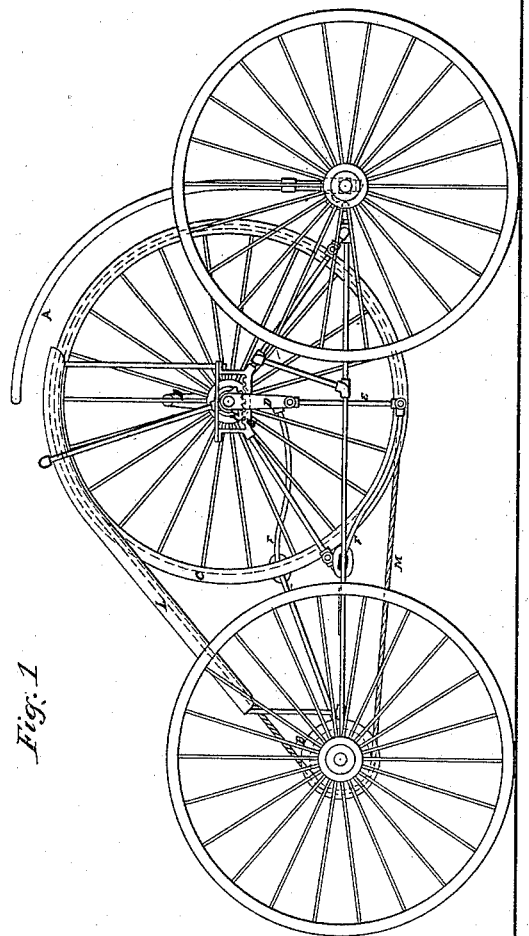
Figure 2:
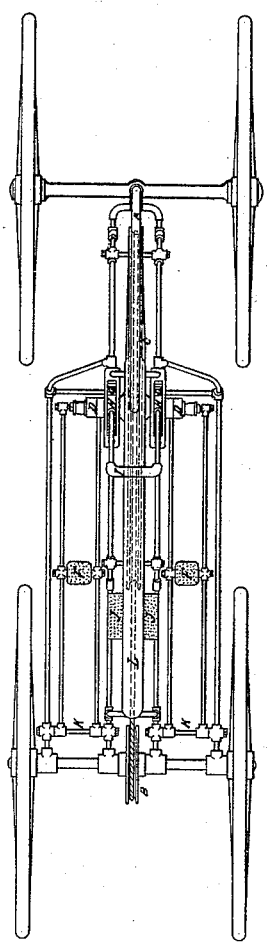

Figure 1 is a side elevation, and Fig. 2 a plan view, of a machine embodying my invention, similar letters of reference indicating corresponding parts in the respective figures.

This invention consists in mounting a fly-wheel upon the crank-axle of a velocipede and connecting the same to one of the propelling-axles by means of an endless belt, said crank-axle being capable of adjustment toward or from the said propelling-axle, whereby the connecting-belt may be tightened to transmit motion or slackened to excommunicate it, at the will of the rider.

The invention also consists in arranging the operative parts to accommodate the rider in a standing or upright position, whereby the power of the rider is applied to the treadles substantially in a line direct with said upright position, which secures the advantage of the rider's weight in the application of the power, and effects much easier and more rapid application than the sitting position of the rider as heretofore assumed.

In the accompanying drawings I have illustrated a skeleton machine containing the essential elements of my invention, which may be otherwise relatively arranged and such changes made in the details of construction tending to simplify or beautify the machine that experience may suggest in building or using the same.

Referring to the drawings, an ordinary four-wheel running or propelling gear is shown, with the hind wheels fixed to their axle to revolve therewith, and the forward wheel journaled to revolve upon the axle, the latter being centrally pivoted to the frame-work by a king-bolt and cramped by means of a connected steering-rod. (Represented at A.) The hind axle is supported at right angles to the longitudinal axis of the machine in suitable bearings upon the frame-work, and provided with a centrally-fixed pulley or sheave, B.

C represents a fly-wheel located intermediate of the running-gear, substantially in the relative position shown, and mounted upon the axle of the operating-cranks D D, said crank-axle being supported in movable bearings adjusted forward or backward by means of the pinion H, fixed to the axle engaging with the toothed rack G upon the adjacent frame-work, the adjustment being effected by means of a vibrating lever, I, extended within convenient reach of the rider. The rim of the fly-wheel C is grooved to receive an endless belt, M, which is passed around the same and around the pulley B upon the propelling-shaft, and through which motion is communicated. The cranks D D are turned by the pedals F F through the intervening connecting-rods E E, respectively arranged upon the opposite sides of the fly-wheel, the pedal-rods being journaled to the hind axle, as shown at K K, and the pedals located to accommodate the standing position of the rider.

L represents a shield or casing to keep the rider from contact with the fly-wheel and belt. This shield or casing will, in practice, be extended to inclose the fly-wheel altogether, or sufficiently to fully protect the rider from contact, such construction being purposely omitted in the drawings in order to clearly illustrate the operating and adjusting mechanism.

J J are rests for the rider to stand upon when not engaged in operating the treadles.

Having now referred to such details in the construction and relative arrangement of the parts of a machine embodying my invention as will enable others to understand the same, I will now proceed to set forth the objects and advantages of such construction.

The object of the fly-wheel is to facilitate the starting of the machine and to act by its momentum to prevent a sudden diminution of its speed while under way. In such case it acts as a store of power to continue the movement when the machine temporarily flags.

In the act of starting the machine the belt is slackened by throwing the lever I forward, and the fly-wheel is set in motion through the treadle mechanism. The lever I is then drawn backward, which tightens and brings the belt into engagement with the fly-wheel and pulley B on the propelling-axle, when the machine will start and be kept in motion with very slight exertion on the part of the rider.

As the machine moves from rest the velocity of the fly-wheel may be gradually accelerated until it attains a maximum corresponding to the maximum velocity of the machine, and in ascending grades the force of the fly-wheel comes in as an auxiliary to the power of the rider.

To stop the machine without expending this accumulated force, the fly-wheel is adjusted so as to disengage the belt.

Having thus fully described my invention, what I claim, and desire to secure by Letters Patent, is—

1. A velocipede provided with a fly-wheel attached to its crank-axle and made capable of adjustment forward and backward for the purpose of engagement with or release from the propelling mechanism, substantially as described.

2. A velocipede provided with a fly-wheel attached to its crank-axle and having its treadle mechanism relatively located therewith and with the other operative parts, to enable the rider to operate the same in an upright position, as set forth.

THEODORE J. DE SABLA.

Witnesses:
C. W. FORBES,
AUG. CREVELING.